No. 710,592. Patented Oct. 7, 1902.
M. MEAD.
COMBINED WHEELED SCRAPER AND DUMPING DEVICE.
(Application filed Jan. 20, 1902.)
(No Model.) 2 Sheets—Sheet 1.
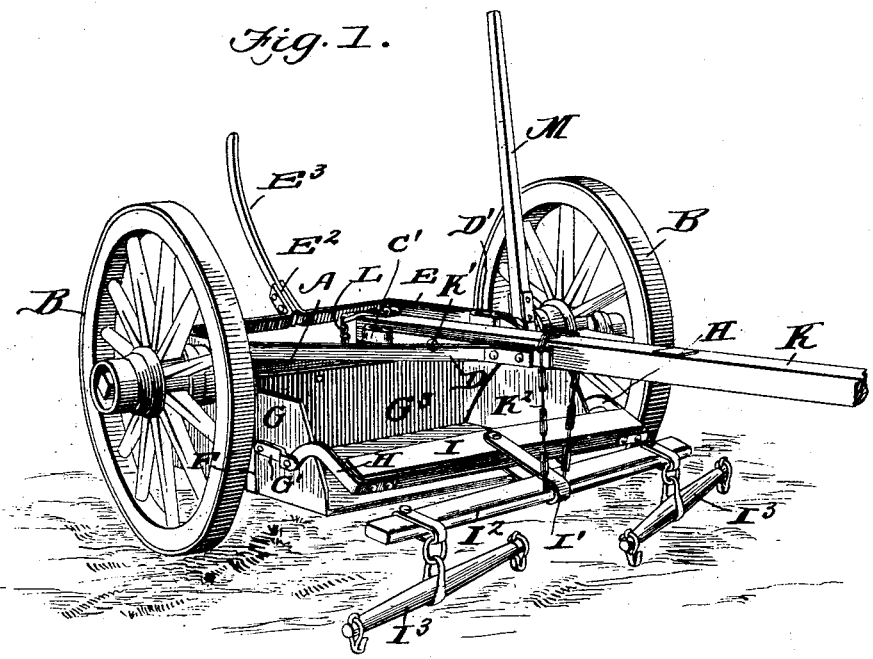
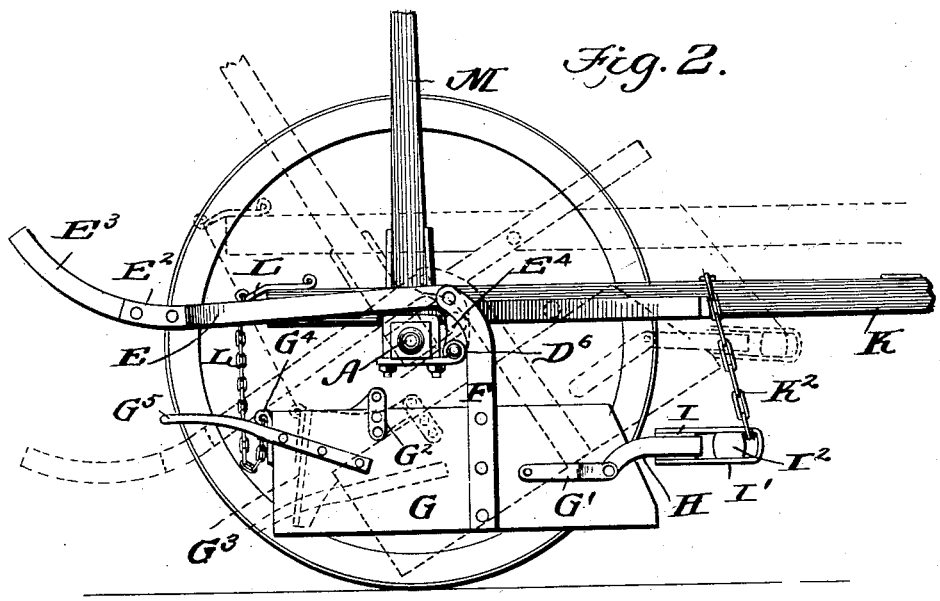
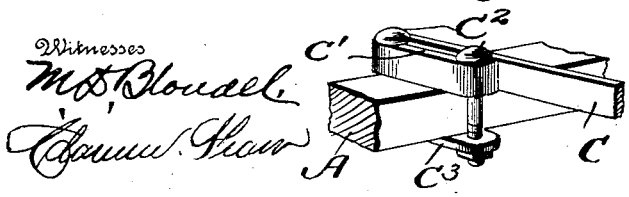
Witnesses
M. A. Blondel
Edward Shaw
Inventor
Marvin Mead,
By Meara & Brock,
Attorneys No. 710,592. Patented Oct. 7, 1902.
M. MEAD.
COMBINED WHEELED SCRAPER AND DUMPING DEVICE.
(Application filed Jan. 20, 1902.)
(No Model.) 2 Sheets—Sheet 2.

Witnesses Inventor
Marvin Mead,
By
Attorneys

UNITED STATES PATENT OFFICE.

MARVIN MEAD, OF PUEBLO, COLORADO.

COMBINED WHEELED SCRAPER AND DUMPING DEVICE.

SPECIFICATION forming part of Letters Patent No. 710,592, dated October 7, 1902.

Application filed January 20, 1902. Serial No. 90,510. (No model.)

*To all whom it may concern:*

Be it known that I, MARVIN MEAD, a citizen of the United States, residing at Pueblo, in the county of Pueblo and State of Colorado, have invented a new and useful Combined Wheeled Scraper and Dumping Device, of which the following is a specification.

This invention relates generally to wheel-scrapers, and more particularly to a combined scraping and dumping device.

The object of the invention is to provide a device embodying these characteristics which shall be exceedingly strong and durable and highly efficient in operation.

Another object of the invention is to provide a device in which the draft is placed upon the scraper or scoop during the scraping operation, thereby relieving the supporting-frame from strain.

Another object of the invention is to provide a scraper or scoop which dumps rearwardly, thereby avoiding the reversal or turning upside down of the scraper or scoop.

With these objects in view the invention consists, essentially, in suspending a scraper or scoop from a horizontal axle, said suspension device being adjustable, whereby the scraper or scoop can be raised or lowered, as desired, said scraper or scoop being dumped by tilting the axle rearwardly, thereby elevating the forward end of the scraper or scoop, and simultaneously opening the tail-gate of the said scraper or scoop, permitting it to dump rearwardly.

The invention consists also in certain details of construction and novelties of combination, all of which will be fully described hereinafter and pointed out in the claims.

Figure 4:
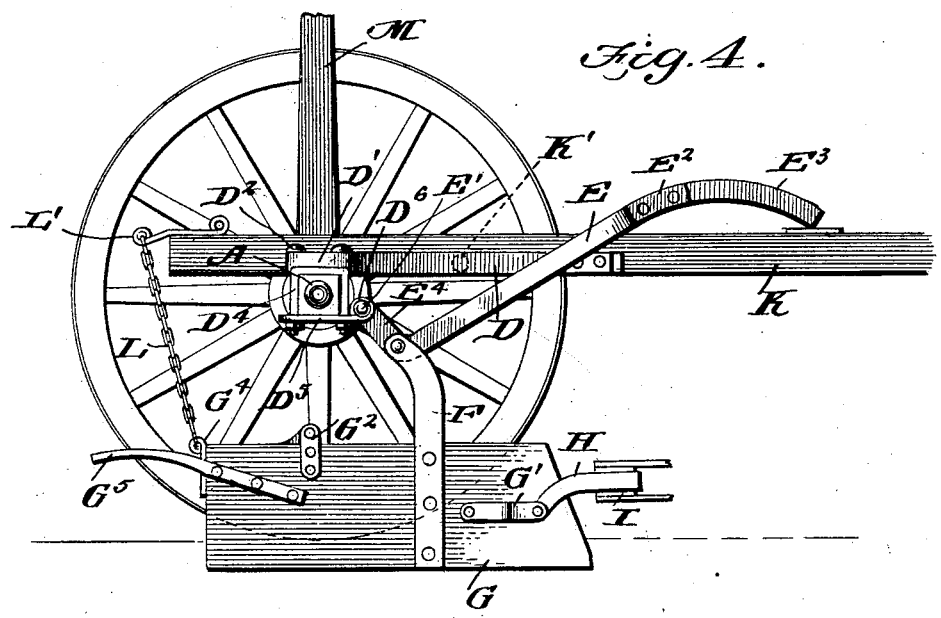
Figure 5:
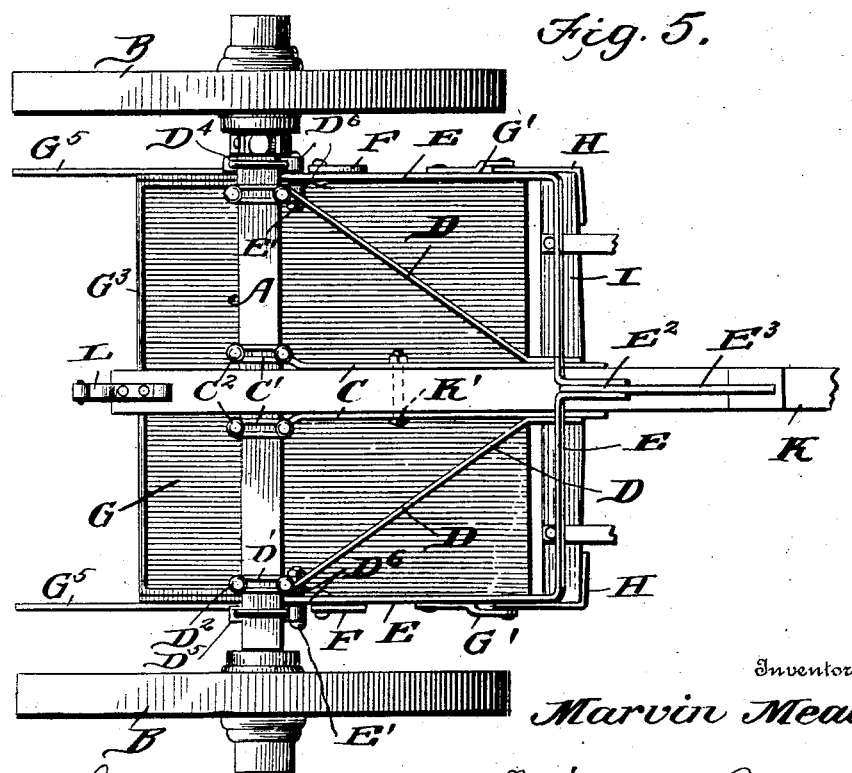

In the drawings forming part of this specification, Figure 1 is a perspective view of a wheel-scraper constructed in accordance with my invention, the scoop or scraper being elevated above the ground. Fig. 2 is a view taken from one side, one of the wheels being removed, the scraper or scoop being shown arranged above the ground in full lines, the position of the parts during the dumping operation being indicated in dotted lines, the spokes of the wheel being omitted in order to more clearly illustrate the position of the several parts. Fig. 3 is a detail perspective view illustrating the manner of securing the bars of the frame to the axle. Fig. 4 is a side view of the device, one of the wheels being removed, the scoop being shown lowered into position for scraping or scooping up the earth. Fig. 5 is a top plan view of the device, the parts being shown in the same position as illustrated in Fig. 4.

It will of course be understood that the device can be made any size desired, according to the work to be done, and that the various parts can be made of any material suitable and convenient for the purpose it is intended to serve.

In the construction of my scraper I employ an axle A, which is preferably square in cross-section and has the ground-wheels B mounted upon its opposite ends. Parallel bars C and the oblique brace-bars D are rigidly connected at their rear ends to the axle A, the forward ends of the said parallel bars C and brace-bars D being connected to each other; but it will be understood that the forward ends of the parallel bars C are not connected to each other, each bar being connected to the adjacent brace-bar. The rear ends of the bars C are preferably bent back upon themselves, providing elongated loops C', through which the bolts $C^2$ pass, the threaded ends of said bolts passing through plates $C^3$, arranged upon the bottom of the axle and secured by suitable nuts, said bolts and plate securely fastening the bar C upon the upper face of the axle. Each brace-bar D is formed with a similar loop D' at its rear end, through which the bolts $D^2$ are passed, said bolts passing through a plate $D^3$, secured upon the bottom of the axle. A clip $D^4$ is arranged upon the outer side of each loop D', said clip being connected to the plate $D^5$, arranged upon the bottom of the axle, and the plates $D^3$ and $D^5$ are each formed with a bearing $D^6$ upon its forward end. The inner ends of the lever-arms E are pivoted between these bearings $D^6$, a pivot-bolt E' passing through said bearings and also through the end of each lever-arm E, said lever-arms being bent toward each other and secured at $E^2$ to an operating-handle $E^3$. Each lever-arm E is formed with a bend or elbow $E^4$ adjacent to its inner or pivotal end, and connected to each lever at this bend or loop is a suspending strap or bail F, said bail or strap being rigidly secured to the scoop G, upon the exterior thereof. Ears or lugs G' are secured on the outer side of each end of the scoop or scraper, and pivotally connected to each ear or lug is a metallic strap or plate H, said plate or strap being rigidly connected to the adjacent end of a draft bar or beam I, said beam having a clevis I' connected to the center of the same and carrying the doubletree $I^2$, the ends of said doubletree being provided with singletrees $I^3$. The tongue or pole K rests between the parallel bars C and is pivotally connected to said bars about midway their length by means of a bolt K', passing horizontally through the said bars and tongue or pole. The rear portion of the tongue or pole rests upon the axle A, the rear end projecting a short distance beyond the said axle, as most clearly illustrated in Figs. 2 and 4. The tongue or pole is not connected to the axle or frame in any other manner. A chain $K^2$ is passed around the tongue or pole and supports the doubletree in its proper position, said chain preferably passing through the clevis I'. The scraper is provided with upwardly-projecting ears $G^2$, to which the tail-gate $G^3$ is pivoted, said tail-gate being provided with inwardly-projecting wings, which are connected to the said ears $G^2$. A hook $G^4$ is attached to the upper edge of the tail-gate at its center, and connected to said hook is a chain L, the upper end of which is connected to a hook or plate L', secured upon the rear end of the tongue or pole K. Rearwardly and upwardly projecting handles $G^5$ are also attached to the ends of the scoop. In Figs. 1 and 2 I have shown the scraper or scoop elevated above the ground, and this is the position it would occupy during transportation, either loaded or unloaded. It will be noted that the lever-arms E are thrown rearwardly and forced down until they meet and rest upon the axle A. This brings the pivot-point between the bails F and lever E to a substantially central position, thereby throwing the weight of the scraper or scoop loaded or unloaded upon the axle. The draft-beam is also held in its proper position.

When it is desired to scrape or scoop the earth, the lever-arms E are thrown forwardly, the handle $E^3$ resting upon the tongue or pole, as most clearly shown in Figs. 4 and 5. This forward movement of the lever-arms lowers the scoop, so that its forward edge will contact with the ground and scoop or scrape off a definite amount thereof. The draft will be applied directly to the front end of the scoop, thereby relieving the supporting-frame of all strain. After the scoop has been filled the lever-arms are thrown back to the position indicated in Figs. 1 and 2, and the loaded scoop is then ready for transportation. When it is desired to dump the scoop, the axle A is rocked by means of a hand-lever M, rigidly connected thereto, said rearward rocking movement of the axle serving to tilt the scraper or scoop upwardly at its forward end and downwardly at its rear end, and inasmuch as the tongue or pole is pivoted between the parallel bars C said tongue or pole will remain substantially horizontal, but will be slightly elevated, owing to the fact that the parallel bars C are elevated or inclined by the rocking movement of the axle. This upward movement of the tongue or pole causes an upward pull upon the chain L, thereby completely opening the tail-gate at the rear end of the scoop simultaneously with the lowering of the rear end and the raising of the forward end, thereby completely and quickly dumping the scraper or scoop. After the dumping operation has been effected the parts are permitted to assume their normal positions, and the empty scoop can then be wheeled back to its place of operation.

It will thus be seen that I provide an exceedingly strong and durable wheel scraper or scoop, and one which on account of its simplicity of parts can be quickly and easily loaded and unloaded.

Having thus fully described my invention, what I claim as new, and desire to secure by Letters Patent, is—

1. In a wheeled scraper, the combination with the axle, of the frame connected thereto, the lever-arms pivotally connected to the axle, the scraper or scoop suspended from said lever-arms, the pole or tongue pivotally connected to the frame, means for rocking the axle and a connection between the rear end of the tongue or pole and the tail-gate of the scraper or scoop, substantially as described.

2. In a wheeled scraper, the combination with an axle, of a frame rigidly secured to the axle, the tongue or pole pivotally connected to said frame, a scraper or scoop arranged beneath the axle and suspended therefrom, said scraper or scoop having an upwardly-opening tail-gate at its rear end, means for connecting the upper ends of said tail-gate to the rear end of the tongue or pole for the purpose described.

3. In a wheeled scraper, the combination with the axle, frame, tongue or pole, of the scraper or scoop having a tail-gate hinged at its rear end, the suspending-straps attached to the scraper or scoop, the lever-arms pivotally connected to the axle, said lever-arms being bent adjacent to their pivotal end, the suspending-straps being connected to said levers at the bend, and a lever rigidly connected to the axle for the purpose of tilting the same, substantially as and for the purpose described.

4. In a wheeled scraper, the combination with the axle, of a frame rigidly secured thereto, a tongue or pole pivotally connected to the frame, a scraper or scoop suspended beneath the frame, means for raising and lowering the said scraper or scoop horizontally, a lever connected to the axle for tilting said axle, a connection between the rear end of the pole or tongue, and the tail-gate of the scoop or scraper, a draft appliance attached to the forward end of the scraper or scoop and a chain connected to said draft appliance and passing around the pole or tongue, substantially as described.

5. In a wheeled scraper, the combination with the axle of parallel bars and brace-bars, the rear ends of said bars having elongated loops formed thereon, the bolts passing through said loops, and the plates arranged upon the bottom of the axle and through which the bolts pass, substantially as described.

6. In a wheeled scraper, the combination with a scraper or scoop, of the upwardly-projecting lugs adjacent to the rear end of said scraper or loop, the tail-gate having forwardly-projecting wings pivoted to the upper ends of the said lugs, the ears arranged upon the ends of the scoop or scraper adjacent to the front thereof, the straps pivotally connected to said ears and the draft-beams attached to said straps, substantially as set forth.

7. In a wheeled scraper, the combination with the axle, of horizontal frame rigidly secured to said axle, the pole or tongue resting upon the axle and pivotally connected to the frame, the angular lever-arms pivotally connected to the axle, said arms being connected to each other and to an operating-handle, the suspending-straps, the scraper or scoop attached to said straps, the hinged tail-gate, the chain connecting said tail-gate and the rear end of the tongue or pole, the lever rigidly connected to the axle for the purpose of tilting the same, a draft-beam connected to the forward end of the scraper or scoop, and a chain connected to said draft-beam, said chain passing over the tongue or pole, substantially as described.

MARVIN MEAD.

Witnesses:
ALVA ADAMS,
ANDREW MCCLELLAND.